US009489228B2

United States Patent
Tsirkin et al.

(10) Patent No.: US 9,489,228 B2
(45) Date of Patent: Nov. 8, 2016

(54) DELIVERY OF EVENTS FROM A VIRTUAL MACHINE TO A THREAD EXECUTABLE BY MULTIPLE HOST CPUS USING MEMORY MONITORING INSTRUCTIONS

(71) Applicant: Red Hat Israel, Ltd., Raanana (IL)

(72) Inventors: Michael Tsirkin, Raanana (IL); Avi Kivity, Raanana (IL); Dor Laor, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 298 days.

(21) Appl. No.: 13/686,442

(22) Filed: Nov. 27, 2012

(65) Prior Publication Data

US 2014/0149633 A1   May 29, 2014

(51) Int. Cl.
G06F 9/455 (2006.01)

(52) U.S. Cl.
CPC . G06F 9/45558 (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2006/0010440 A1* | 1/2006 | Anderson et al. | 718/1 |
| 2009/0089527 A1* | 4/2009 | Schoenberg et al. | 711/163 |
| 2009/0216974 A1* | 8/2009 | Morishima | G06F 9/4856 711/162 |
| 2011/0107007 A1* | 5/2011 | van Riel et al. | 711/6 |
| 2011/0161541 A1* | 6/2011 | Madukkarumukumana et al. | 710/260 |

* cited by examiner

*Primary Examiner* — Adam M Queler
*Assistant Examiner* — Tracy Chan
(74) *Attorney, Agent, or Firm* — Lowenstein Sandler LLP

(57) ABSTRACT

A method and system for managing a virtual computing system including a hypervisor managing a virtual machine (VM) configured to communicate with a thread executable by multiple host central processing units (CPUs), using memory monitoring instructions. The hypervisor provides the virtual machine with a first notification identifying a first designated memory range writeable by a virtual central processing unit (VCPU) associated with the virtual machine and a first instruction to write to the first designated memory range to communicate with the thread running on a first host CPU. The hypervisor further identifies movement of the thread from the first host CPU to a second host CPU and provides to the virtual machine a second notification identifying a second designated memory range and a second instruction to write to the second designated memory range to communicate with the thread running on the second host CPU.

17 Claims, 5 Drawing Sheets

DELIVERY OF EVENTS FROM A VIRTUAL MACHINE TO A THREAD EXECUTABLE BY MULTIPLE HOST CPUS USING MEMORY MONITORING INSTRUCTIONS

TECHNICAL FIELD

Embodiments of the present disclosure relate to a computer system, and more specifically, to managing the delivery of an event from a virtual machine to a thread executing on multiple host central processing units (CPU) based on memory monitoring instructions in a virtualized computing system.

BACKGROUND

In order to preserve power resources and lower overhead usage, conventional physical CPUs utilize memory monitoring instructions (e.g., monitor and mwait instructions) designating a range of memory that allow the physical CPU to stop instruction execution. The physical CPU executing the monitoring instruction is blocked from further execution and enters a wait state until there is a change to the designated memory by another physical CPU or an interprocessor interrupt is received.

However, in virtualized computing systems, if a virtual machine attempts to write to the designated memory block in order to wake-up the physical CPU executing memory monitoring instructions, a virtual machine exit is performed which causes a transition of control from the virtual machine to the software layer providing the virtualization, commonly referred to as a hypervisor (also known as a virtual machine monitor (VMM)).

Furthermore, if a virtual machine attempts to deliver an event to a thread executing on multiple host CPUs, the designated range of memory that the VM writes to in order to deliver the event to the destination thread changes when the destination thread moves from one host CPU to another host CPU.

DETAILED DESCRIPTION

Figure 1:
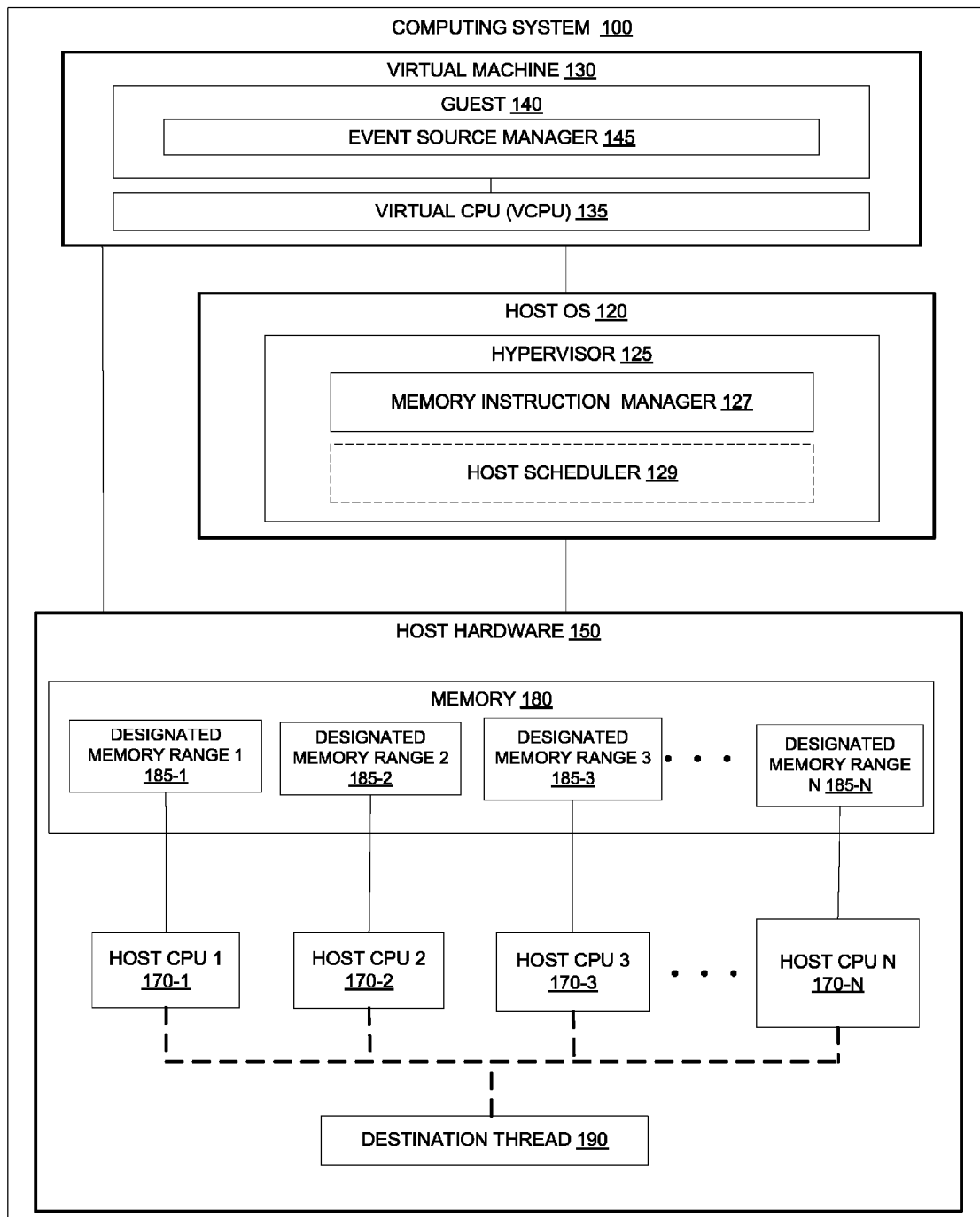
FIG. 1 is a block diagram of an example computer system configured to allow a virtual machine to deliver an event to a thread executing on multiple host CPUs, according to an embodiment of the present disclosure.

Disclosed herein are methods and systems for managing a virtual computing system including a virtual machine (VM) configured to send an event to a thread (e.g., an application) configured to be executed on multiple host central processing units (CPUs) using memory monitoring processing. The first host CPU executing the destination thread executes a memory monitoring instruction (e.g., a wait instruction) on a first designated memory range of a memory shared by multiple host CPUs. The virtual computing system includes a hypervisor configured to notify a virtual CPU (VCPU) of the VM (also referred to as the "source VM") that the source VM may write to the first designated memory address (e.g., modify the first designated memory) in order to send a request for the performance of an event or action (e.g., the sending of a network packet) to the destination thread executing on the first host CPU. The VCPU of the source VM may send an event to the thread running on a host CPU by writing data to the first designated memory range, without causing a VM exit. In an example, after receiving the event, the host CPU executing the destination thread may retrieve event information from the source VM.

In an example, a host operating system (OS) may move the destination thread from the first host CPU to another host CPU (also referred to as a "second host CPU") associated with a second designated memory block that may be written to in order to send an event to the thread. In an example, a host scheduler tracks the movement of the destination thread. In an example, the host scheduler is part of the hypervisor and, as such, the host scheduler module of the hypervisor detects the movement of the destination thread.

The hypervisor can notify the VCPU of the source VM of the second designated memory block and instruct the VCPU to write to the second designated memory block in order to deliver an event to the destination thread. Alternatively, the hypervisor can modify the mapping of the physical address of the source VCPU to map to the second designated memory block.

In an example, if the destination thread stops running on a host CPU, the hypervisor may instruct the source VCPU to discontinue writing to the designated memory block and perform a VM exit. Following the VM exit, control is transition to the hypervisor which may then wake up the destination thread.

In another example, the hypervisor may write-protect the designated memory block being written to by the source VCPU. When the source VCPU attempts to write to the write-protected memory block, a VM exit is forced and the hypervisor takes control and performs a wake-up of the destination thread.

Accordingly, an efficient method and system is provided that enables a virtual machine (e.g., the source VM) to send events to a thread executing on multiple host CPUs using memory monitoring instructions. The tracking of the movement of the thread between the multiple host CPUs allows for the delivery of the event requests by the source VCPU to the appropriate designated memory block, without an interruption of communication between the source VCPU and the destination thread.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example computing system 100 in which examples of the present disclosure may operate. The computing system 100 hosts a virtual machine (VM) 130, also referred to as the "source VM". The virtual machine 130 runs a guest (e.g., guest 140)

that uses a guest operating system to manage its resources. The virtual machine 130 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory, virtual CPU (e.g., VCPU 135), virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

The computing system 100 runs a hypervisor 125 to virtualize access to the underlying host hardware 150, making the use of the virtual machine 130 transparent to the guest 140 and the users of the computing system 100. The hypervisor 125 may support the virtual machine 130. In one example, the hypervisor 125 is part of a host operating system (OS) 120.

The computing system 100 also includes hardware components (host hardware) including multiple host central processing units (CPUs) 170 (e.g., host CPU 1 170-1, host CPU 2 170-2, host CPU 3 170-3, . . . host CPU N 170-N shown in FIG. 1). The computing system 100 may also include a shared memory 180, input/output (I/O) devices and other hardware components (not shown). In an example, the shared memory 180 includes multiple designated memory ranges 185 each associated with one of the multiple host CPUs 170 (e.g., designated memory range 1 185-1 associated with host CPU 1 170-1, designated memory range 2 185-2 associated with host CPU 2 170-2, designated memory range 3 185-3 associated with host CPU 3 170-3, . . . designated memory range N 185-N associated with host CPU N 170-N shown in FIG. 1). In one example, the multiple host CPU 170s are configured to execute a thread 190 configured to receive and perform events based on event requests from the VCPU 135 of the source VM 130 in accordance with the example methods described in connection with FIGS. 2-4. The thread (also referred to as the "destination thread") 190 may include any sequence of programmed instructions that may be managed by the host OS 120, such as, for example, an application. Example event requests submitted by a guest 140 include a request to transmit a packet, a request to perform a disk I/O operation, a request to output an image to a display, a request to send data on a serial port, etc.

In an example, the hypervisor 125 includes a memory instruction manager 127 configured to notify the VCPU 135 of the VM 130 of an appropriate designated memory range 185 of memory 180 that may be written to in order to deliver an event to the destination thread 190 (also referred to as a "memory designation notification"). It is noted that the memory designation notification may be provided by the hypervisor 125 either prior to or following the execution of a memory instruction (e.g., a wait instruction) by the host CPU 170 running the destination thread 190 on the associated designated memory range 185. In an example, the memory instruction manager 127 is configured to notify the source VM 130 that the source VM 130 may write to the designated memory range 185 (e.g., modify the designated memory range) in order to wake up the host CPU and deliver an event to the host CPU (also referred to as an "memory writing notification"). In an example, the notification provided to the source VM 130 instructs the source VM 130 that a write to the designated memory range 185 may be used to send an event to the destination thread 190, without causing an exit to the hypervisor 125. In an example, after receiving the event, the destination thread 190 may retrieve event information from the source VM 130.

In an example, a host scheduler 129 tracks the movement of the destination thread 190 between the multiple host CPUs 170 (e.g., from a first host CPU to a second host CPU). In an example, the host scheduler 129 is a module of the host OS 120 and, upon detection of the movement of the destination thread 190 to a new host CPU, notifies the hypervisor 125 of the movement. In another example, the host scheduler 129 is part of the hypervisor (as denoted by the dashed line in FIG. 1), and as such, the host scheduler 129/hypervisor 125 tracks the movement of the destination thread 129 from one host CPU to another host CPU.

In an example, the guest 140 includes an event source manager 145 configured to receive the memory designation notification and the memory writing notification from the hypervisor 125. In an example, the event source manager 145 is further configured to use the notifications to maintain or store an association between the destination thread 190, the one or more host CPUs 170 running (either currently or previously) the destination thread 190, and the designated memory range associated with the one or more host CPUs in order to identify the appropriate memory range to write to in order to communicate with the destination thread 190 for performance of a requested event.

In an example, the memory instruction manager 127 is configured to manage the memory range designations and assignments to the respective host CPUs 170. In this example, the memory instruction manager 127 may reserve different memory ranges for specific event sources. For example, a first designated memory range may be dedicated for use by source VCPUs, a second designated memory range may be dedicated for use by physical CPUs, a third designated memory range may be dedicated for use by one or more devices (e.g., a printer, a display), etc.). In an example, the memory 180 and/or the multiple designated memory ranges 185 may include a portion which is protected and not writeable by the VCPU 135 of the source VM 130.

Advantageously, the hypervisor 125 is configured to allow the source VM 130 to deliver event requests to the destination thread 190 using memory monitoring instructions, without causing an exit to the hypervisor, resulting in the avoidance of the trapping of instructions by the hypervisor 125 and the reduction in the computational and time expenses associated with the jumping to an interrupt vector associated with a conventional interrupt of a physical CPU. Furthermore, the hypervisor 125 monitors the movement of the destination thread 190 between multiple host CPUs, and manages the event delivery process such that the VCPU 135 of the source VM 130 is able to maintain communication with the destination thread following movement of the destination thread from a first host CPU to a second host CPU.

Figure 2:
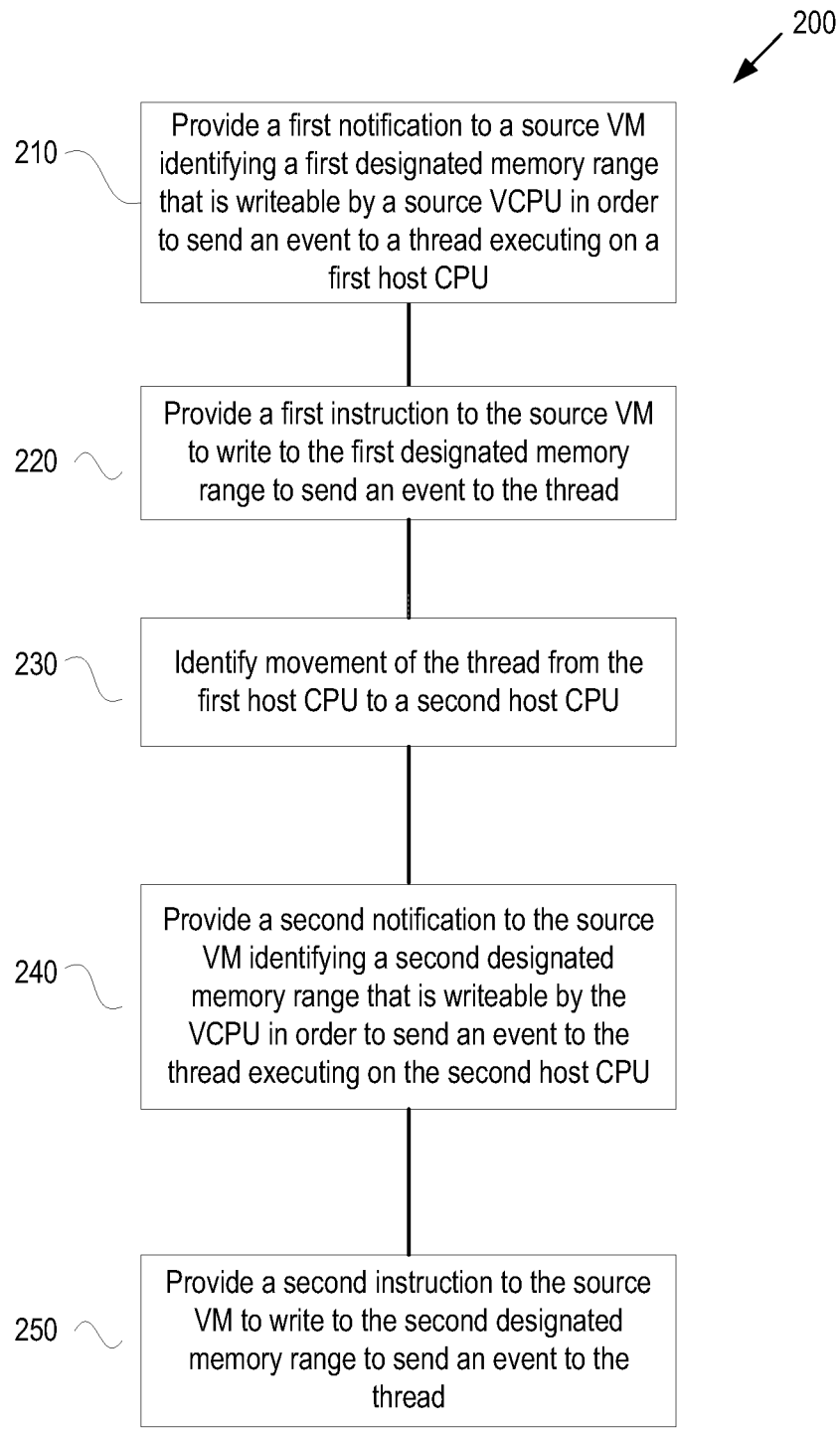
FIG. 2 is a flow diagram of an example method for managing delivery of an event from a virtual machine to a thread executing on multiple host CPUs, according to an embodiment of the present disclosure.

FIG. 2 is a flow diagram illustrating one example of a method 200 for the delivery of an event using a memory monitoring instruction, by a VCPU of a source VM, to a specific thread (i.e., the destination thread) which executes on multiple host CPUs, without causing an exit to a hypervisor managing the source VM. According to examples of the present disclosure, method 200 may be performed by computer system (e.g., computer system 100 of FIG. 1 or computer system 500 of FIG. 5) that may comprise hardware (e.g., circuitry, dedicated logic, programmable logic, microcode, etc.), software (e.g., instructions run on a processing device), or a combination thereof. In one example, the method 200 is performed by the hypervisor 125 of FIG. 1.

In one example, a host CPU (e.g., the host CPU 1 170-1 of FIG. 1) running the destination thread executes a memory monitoring instruction (e.g., a wait instruction) on a memory range associated with the host CPU (e.g., designated memory range 1 185-1 of FIG. 1). In block 210, the hypervisor (e.g., hypervisor 125 of FIG. 1) provides a notification to a VCPU of a source VM (e.g., VCPU 135 of VM 130 in FIG. 1) identifying an address range that may be written to by the VCPU in order to deliver an event to the destination thread running on the host CPU. It is noted that the aforementioned setup steps may be performed in any order, e.g., the memory monitoring instruction may be executed before the hypervisor provides the notification to the source VCPU, or vice versa.

In an example, the designated memory range may include a portion that is protected and not writeable by the source VM. Optionally, the protected portion of the designated memory range may be reserved for use by another host CPU. In an example, the source VM may instruct the VCPU to write to a portion of the designated memory range which is dedicated for use by a VCPU.

Referring to FIG. 2, in block 220, the hypervisor provides a first instruction to the source VM to write to the first designated memory range (associated with the host CPU running the destination thread) to send an event to the destination thread. In an example, the source VM may be configured to maintain an association between the first designated memory range, the destination thread, and the first host CPU to enable the source VM to manage event delivery and track the manner in which the memory location associated with the first host CPU (currently executing the destination thread) may be modified in the virtual mode in order to deliver an event for execution by the destination thread. In an example, the source VM may store the association between the first designated memory range and the first host CPU in a memory associated with the source VM.

In block 230, the hypervisor identifies the movement of the destination thread by the host OS from the first host CPU to another host CPU (also referred to as the "second host CPU") configured to execute a memory monitoring instruction on an associated memory range (i.e., a second designated memory range). In an example, the movement is detected by a host scheduler, which may be a part of the hypervisor or separate from the hypervisor. In block 240, the hypervisor provides a second notification to the VCPU of the source VM identifying the second designated memory range that is writeable by the VCPU in order to communicate with and send an event to the destination thread running on the second host CPU. In block 250, the hypervisor provides a second instruction to the VCPU of the source VM to write to the second designated memory range (e.g., modifies the memory) to deliver an event to the destination thread, without an exit to the hypervisor. In an example, the data written to the second designated memory range includes information defining the specific event that is to be executed. In this example, the second host CPU may read the data that is written to the second designated memory block to identify what action the thread/second host CPU is being asked to perform. In an example, the modifications to the designated memory range may be performed by one or more atomic instructions (e.g., a locked memory instruction).

Figure 3:
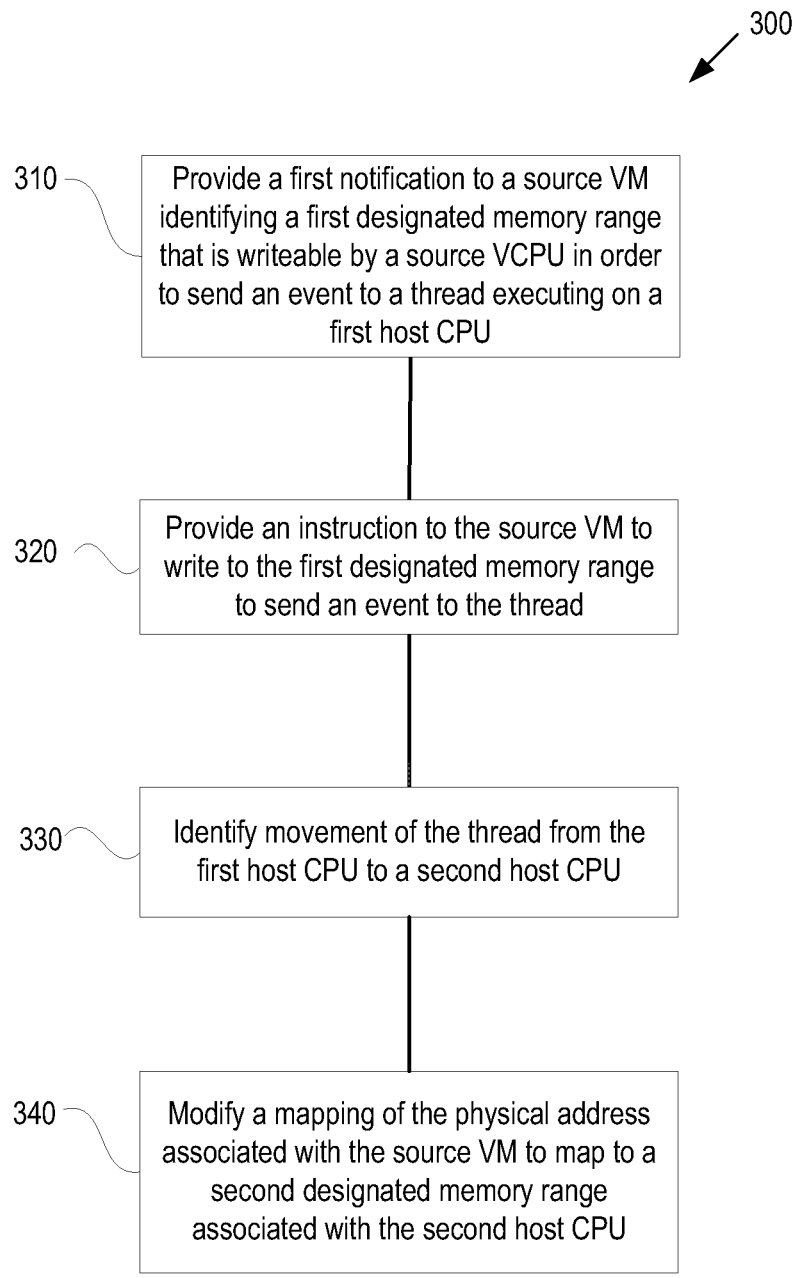
FIG. 3 is a flow diagram of an example method for managing delivery of an event from a virtual machine to a thread executing on multiple host CPUs, according to an embodiment of the present disclosure.

FIG. 3 is a flow diagram illustrating a method 300 for managing the delivery of an event by a source VM to a thread executing on multiple host CPUs using a memory monitoring instruction, without causing an exit to a hypervisor managing the source VM. The method 300 may be performed by a computer system (e.g., computer system 100 of FIG. 1 or computer system 500 of FIG. 5) that may comprise hardware (e.g., circuitry, dedicated logic, programmable logic, microcode, etc.), software (e.g., instructions run on a processing device), or a combination thereof. In one example, the method 300 is performed by the hypervisor 125 of FIG. 1.

In block 310, the hypervisor (e.g., hypervisor 125 of FIG. 1) provides a notification to a VCPU of a source VM (e.g., VCPU 135 of VM 130 in FIG. 1) identifying an address range that may be written to by the VCPU in order to deliver an event to the destination thread running on the host CPU (i.e., a first host CPU). In an example, the first host CPU executes a memory monitoring instruction on the address range (i.e., the designated memory range) and enters a wait mode until data is written to the designated memory range or an interrupt is received. It is noted that the execution of the memory monitoring instruction by the first host CPU and the notification in block 310 may be performed in any order, e.g., the memory monitoring instruction may be executed before the hypervisor provides the notification to the source VCPU, or vice versa.

Referring to FIG. 3, in block 320, the hypervisor provides an instruction to the source VM to write to the first designated memory range (associated with the host CPU running the destination thread) to send an event to the destination thread. In an example, when the VCPU of the source VM begins to write data to the first designated memory range, the physical address of the source VM is mapped to the first designated memory range. In an example, the memory map is part of the hypervisor and may be maintained in the memory 180. As described above in connection with FIG. 2, in block 330, the hypervisor identifies the movement of the destination thread by the host OS from the first host CPU to another host CPU (also referred to as the "second host CPU") configured to execute a memory monitoring instruction on an associated memory range (i.e., a second designated memory range). In block 340, the hypervisor modifies the mapping of the physical address associated with the source VM to map to the second designated memory range. Accordingly, the VCPU of the source VM may write to the second designated memory range to deliver an event to the destination thread running on the second host CPU following execution of a memory monitoring instruction on the second designated memory range by the second host CPU.

Advantageously, methods 200 and 300 realize the benefit of allowing a virtual machine to deliver event requests to a destination thread running on a first host CPU using memory monitoring instructions without causing a VM exit to the hypervisor, thereby reducing the computational and time overhead associated with the VM exit communication protocol and without a conventional interrupt and the associated computational/time expense associated with jumping to an interrupt vector. Furthermore, methods 200 and 300 allow for the identification of a movement of the destination thread executing on multiple host CPUs from a first host CPU to another host CPU, and the establishment of communication between the source VM and the destination thread for the deliver of an event using memory monitoring instructions.

Figure 4:
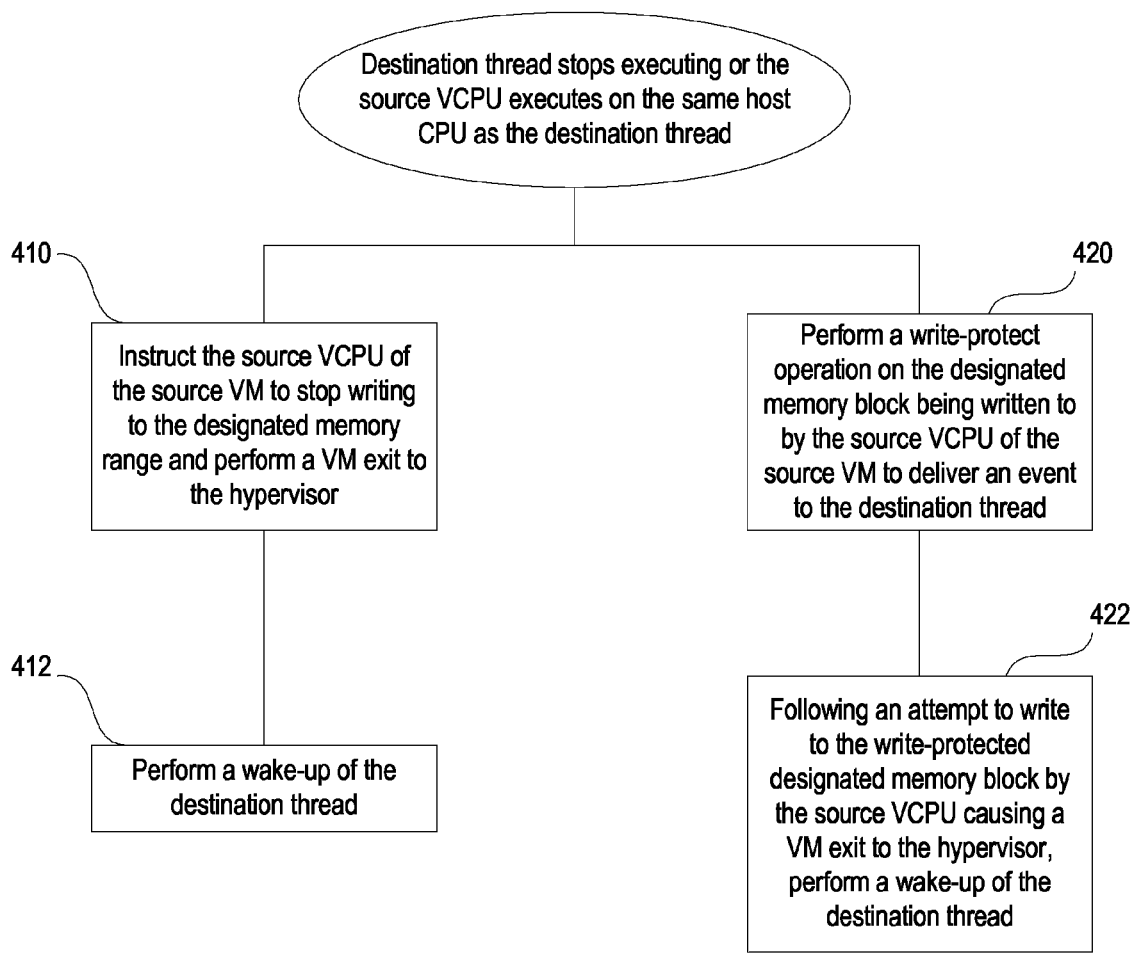
FIG. 4 is a flow diagram of an example method for waking up a non-executing thread for communication with a virtual machine, according to an embodiment of the present disclosure.

FIG. 4 is a flow diagram illustrating one example of a method 400 for managing the transition of control to the hypervisor in order to wake up of a destination thread. The method 400 may be performed by a computer system (e.g., computer system 100 of FIG. 1 or computer system 500 of FIG. 5) that may comprise hardware (e.g., circuitry, dedicated logic, programmable logic, microcode, etc.), software (e.g., instructions run on a processing device), or a combination thereof. In one example, the method 400 is performed by the hypervisor 125 of FIG. 1.

As shown in FIG. 4, the hypervisor detects that the destination thread stopped executing on a host CPU or the VCPU of the source VM is executed on the same host CPU as the destination thread (e.g., the destination thread is moved to a host CPU which is also executing the source VM). In an example, the hypervisor is configured to handle the wake-up of the non-executing destination thread according to blocks 410 and 412. In this example, in block 410, the hypervisor instructs the VCPU of the source VM to stop writing to the designated memory range associated with the host CPU which previously executed the non-executing destination thread and perform a VM exit. Following the VM exit and transition of control to the hypervisor, the hypervisor performs a wake-up of the destination thread, in block 412.

In another example, the hypervisor may be configured to handle the wake-up of the non-executing destination thread according to blocks 420 and 422. In block 420, following a determination that the destination thread stopped executing, the hypervisor performs a write-protect operation on the designated memory block being written to by the VCPU of the source VM to deliver an event to the destination thread. Having write-protected the designated memory block, an attempt to write to the designated memory block by the VCPU of the source VM causes a VM exit to the hypervisor, In block 422, following the VM exit and transition of control to the hypervisor, the hypervisor performs a wake-up of the destination thread.

Figure 5:
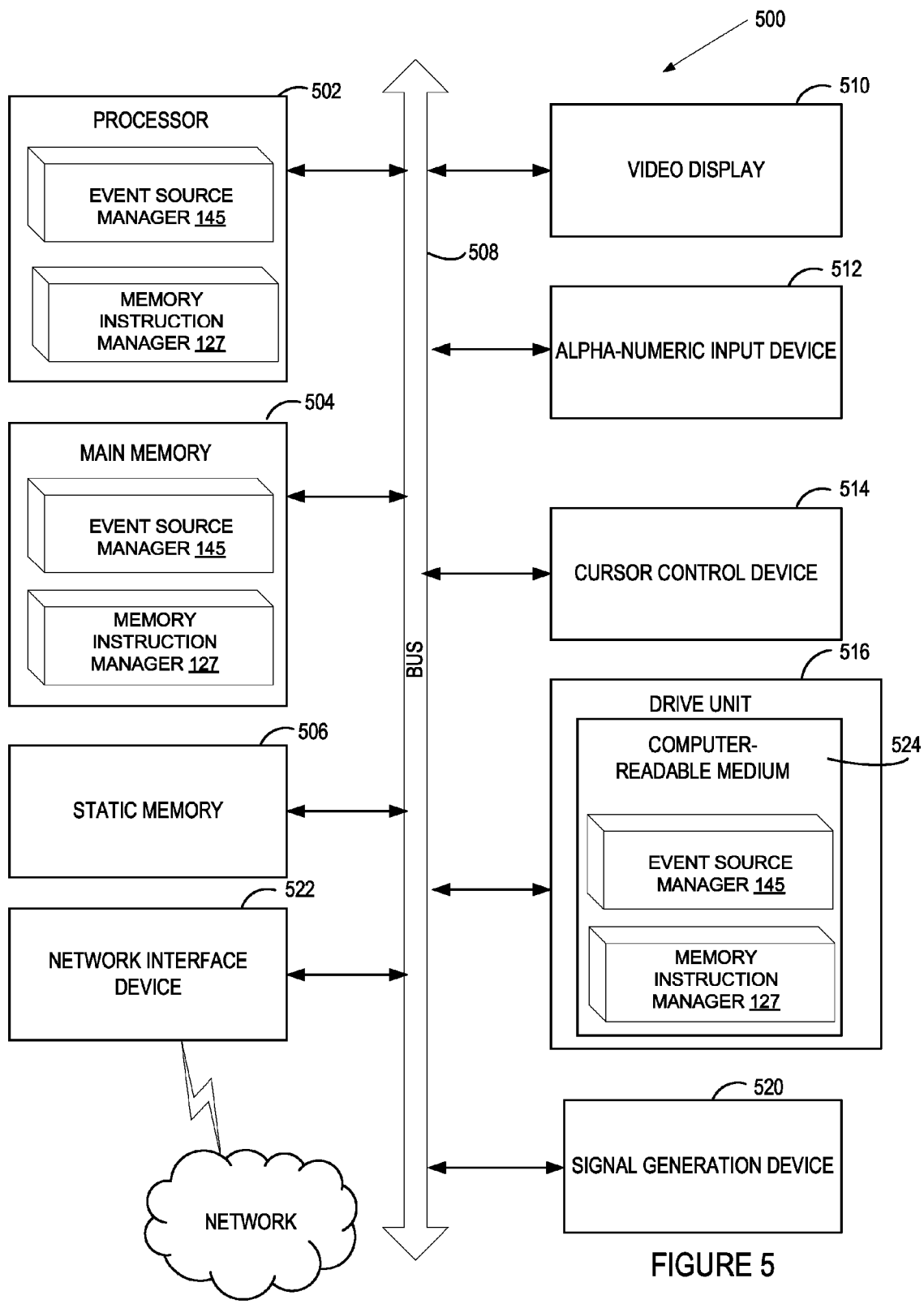
FIG. 5 illustrates a diagrammatic representation of an example event delivery management system, according to an embodiment of the present disclosure.

FIG. 5 illustrates a diagrammatic representation of a machine in the example form of a computer system 500 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The event source manager 145 and/or the memory instruction manager 127 shown in FIG. 1 may be executed by processor 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the event source manager 145 and/or the memory instruction manager 127) embodying any one or more of the methodologies or functions described herein. The instructions of the event source manager 145 and/or the memory instruction manager 127 may also reside, completely or at least partially, within the main memory 504 and/or within the processor 502 during execution thereof by the computer system 400, the main memory 504 and the processor 502 also constituting computer-readable media. The instructions of the event source manager 145 and/or the memory instruction manager 127 may further be transmitted or received over a network via the network interface device 522.

While the computer-readable storage medium 524 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "providing", "identifying", "detecting", "instructing", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    providing, by a processing device executing a hypervisor to a virtual machine executing a guest, a first notification identifying a first designated memory range writeable by a virtual central processing unit (VCPU) associated with the virtual machine to communicate with a thread running on a first host central processing unit (CPU);
    providing, by the hypervisor to the VCPU, a first instruction to write to the first designated memory range to communicate with the thread;
    identifying movement of the thread from running on the first host CPU to running on a second host CPU;
    providing in response to identifying movement of the thread from running on the first host CPU to running on the second host CPU, by the hypervisor to the virtual machine, a second notification identifying a second designated memory range writeable by the VCPU to communicate with the thread running on the second host CPU;
    providing, by the hypervisor to the VCPU, a second notification to write to the second designated memory range to communicate with the thread;
    executing, by the second host CPU running the thread, a memory monitoring instruction to identify the second designated memory range; and
    writing, by the VCPU, data identifying an event for execution by the thread to the second designated memory range, without causing an exit to the hypervisor.

2. The method of claim 1, wherein the thread is executable by a plurality of host CPUs comprising the first host CPU and the second host CPU.

3. The method of claim 2, wherein the hypervisor maintains an association between each of the plurality of host CPUs and a corresponding designated memory range of a shared memory.

4. The method of claim 1, further comprising:
    detecting, by the hypervisor, that the thread stopped executing on at least one of the first host CPU or the second host CPU;
    instructing the VCPU of the virtual machine to stop writing to at least one of the first designated memory range or the second designated memory range, causing an exit to the hypervisor; and
    performing, by the hypervisor, a wake-up of the thread.

5. The method of claim 1, further comprising maintaining, by the virtual machine, a first association between the first designated memory range and the first host CPU and a second association between the second designated memory range and the second host CPU.

6. The method of claim 1, wherein the first host CPU executes a memory monitoring instruction on the first designated memory range.

7. A non-transitory computer readable storage medium comprising instructions that, when executed by a processing device, cause the processing device to:
    provide, by the processing device executing a hypervisor to a virtual machine executing a guest, a notification identifying a first designated memory range writeable by a virtual central processing unit (VCPU) associated with the virtual machine to communicate with a thread running on a first host central processing unit (CPU);
    providing, by the hypervisor to the VCPU, an instruction to write to the identified address range to communicate with the thread;
    identifying movement of the thread from running on the first host CPU to running on a second host CPU;
    modify in response to identifying movement of the thread from running on the first host CPU to running on the second host CPU, by the hypervisor, a mapping of an address associated with the virtual machine to map to a second designated memory range associated with the second host CPU;
    execute, by the second host CPU running the thread, a memory monitoring instruction to identify the second designated memory range; and
    write, by the VCPU, data identifying an event for execution by the thread to the second designated memory range, without causing an exit to the hypervisor.

8. The non-transitory computer readable storage medium of claim 7, wherein the thread is executable by a plurality of host CPUs comprising the first host CPU and the second host CPU.

9. The non-transitory computer readable storage medium of claim 8, the processing device to:
   detect, by the hypervisor, that the thread stopped executing on at least one of the plurality of host CPUs;
   perform, by the hypervisor, a write-protect operation on a designated memory range associated with the at least one of the plurality of host CPUs;
   perform an exit to the hypervisor resulting from an attempt by the VCPU of the virtual machine to write to the write-protected designated memory block; and
   perform, by the hypervisor, a wake-up of the thread.

10. The non-transitory computer readable storage medium of claim 7, wherein the first host CPU executes a memory monitoring instruction on the first designated memory range.

11. The non-transitory computer readable storage medium of claim 7, wherein the write to the second designated memory range comprises executing an atomic instruction.

12. A computer system comprising:
   a memory; and
   a processing device operatively coupled to the memory, the processing device to execute a hypervisor having access to a plurality of host central processing units (CPUs) comprising a first host CPU and a second host CPU, the processing device to:
      provide a virtual machine executing a guest, a first notification identifying a first designated memory range writeable by a VCPU associated with the virtual machine to communicate with a thread running on the first host CPU;
      provide to the VCPU, a first instruction to write to the identified address range to communicate with the thread;
      identify movement of the thread from running on the first host CPU to running on a second host CPU;
      provide to the virtual machine in response to identifying movement of the thread from running on the first host CPU to running on the second host CPU, a second notification identifying a second designated memory range writeable by the VCPU to communicate with the thread running on the second host CPU; and
      provide to the VCPU, a second instruction to write to the second designated memory range to communicate with the thread;
      execute, by the second host CPU running the thread, a memory monitoring instruction to identify the second designated memory range; and
      write, by the VCPU, data identifying an event for execution by the thread to the second designated memory range, without causing an exit to the hypervisor.

13. The computer system of claim 12, the hypervisor to maintain an association between each of the plurality of host CPUs and a corresponding designated memory range of a shared memory.

14. The computer system of claim 12, the hypervisor to:
   detect that the thread stopped executing on at least one of the first host CPU or the second host CPU,
   instruct the VCPU of the virtual machine to stop writing to at least one of the first designated memory range or the second designated memory range, causing an exit to the hypervisor, and
   perform a wake-up of the thread.

15. The computer system of claim 12, the hypervisor to maintain a first association between the first designated memory range and the first host CPU and a second association between the second designated memory range and the second host CPU.

16. The computer system of claim 12, wherein the first host CPU executes a memory monitoring instruction on the first designated memory range.

17. The computer system of claim 12, the hypervisor to:
   detect that the thread stopped executing on at least one of the plurality of host CPUs;
   perform a write-protect operation on a designated memory range associated with the at least one of the plurality of host CPUs, and
   perform a wake-up of the thread following an exit to the hypervisor resulting from an attempt by the VCPU of the virtual machine to write to the write-protected designated memory block.

* * * * *